US012662042B2

(12) United States Patent
Johnson et al.

(10) Patent No.: US 12,662,042 B2
(45) Date of Patent: Jun. 23, 2026

(54) VEHICLE MOUNTED TILT-OUT RECREATIONAL SHELTER

(71) Applicants: Alan L Johnson, Pine River, MN (US); Lee Alan Johnson, Pine River, MN (US)

(72) Inventors: Alan L Johnson, Pine River, MN (US); Lee Alan Johnson, Pine River, MN (US)

( * ) Notice: Subject to any disclaimer, the term of this patent is extended or adjusted under 35 U.S.C. 154(b) by 349 days.

(21) Appl. No.: 18/410,050

(22) Filed: Jan. 11, 2024

(65) Prior Publication Data

US 2024/0262277 A1 Aug. 8, 2024

Related U.S. Application Data

(60) Provisional application No. 63/483,430, filed on Feb. 6, 2023.

(51) Int. Cl.
*B60P 3/34* (2006.01)
(52) U.S. Cl.
CPC ...................................... *B60P 3/34* (2013.01)
(58) Field of Classification Search
CPC ...... B60P 3/32; B60P 3/34; B60P 3/39; B62D 63/061
USPC ........................ 296/164, 165, 173
See application file for complete search history.

(56) References Cited

U.S. PATENT DOCUMENTS

| | | | |
|---|---|---|---|
| 4,181,348 A * | 1/1980 | Whitley .................... | B60P 3/34 |
| | | | 296/26.02 |
| 5,265,394 A | 11/1993 | Gardner | |
| 5,815,988 A | 10/1998 | Molina | |
| 5,864,991 A | 2/1999 | Burns | |
| 5,971,459 A * | 10/1999 | Gauthier ................... | B60P 3/34 |
| | | | 296/26.11 |
| 6,030,026 A * | 2/2000 | Vega ........................ | B60P 3/341 |
| | | | 135/88.13 |
| 6,053,551 A | 4/2000 | Blondeau | |
| 6,394,532 B1 | 5/2002 | Dence | |
| 6,434,895 B1 | 8/2002 | Hosterman et al. | |
| 7,204,536 B2 | 4/2007 | Kunz | |
| 7,488,030 B2 | 2/2009 | Nadeau | |
| 8,267,453 B1 | 9/2012 | Helgesen | |
| 8,562,066 B2 * | 10/2013 | Holtkamp ............... | B60P 3/341 |
| | | | 296/26.02 |
| 9,056,575 B2 | 6/2015 | Pham | |
| 10,316,541 B2 | 6/2019 | Attema | |
| 10,457,189 B1 | 10/2019 | Gaw | |
| 10,538,192 B2 | 1/2020 | Zhou et al. | |
| 12,365,280 B2 * | 7/2025 | Hsu .......................... | B60P 3/341 |
| 2004/0069338 A1 * | 4/2004 | Koss ........................ | E04H 15/06 |
| | | | 135/88.08 |
| 2018/0361904 A1 * | 12/2018 | Huntimer ................. | B60J 5/125 |

* cited by examiner

*Primary Examiner* — Jason S Daniels
(74) *Attorney, Agent, or Firm* — Boyle Fredrickson, S.C.

(57) ABSTRACT

A shelter for outdoor recreation, comprising a base unit and a fixed unit mounted to a vehicle cargo box and a tilting unit pivotally attached to the base unit, said tilting unit rotates approximately 90 degrees to a nesting position over the fixed unit, thereby facilitating transport. The tilting unit quickly detaches from the fixed unit so that the vehicle can be used for other purposes. A bi-fold roof folds to provide clearance for nesting.

8 Claims, 11 Drawing Sheets

VEHICLE MOUNTED TILT-OUT RECREATIONAL SHELTER

CROSS REFERENCE TO RELATED APPLICATION

This application claims the benefit of U.S. provisional application 63/483,430 filed Feb. 6, 2023 and hereby incorporated in its entirety by reference.

STATEMENT REGARDING FEDERALLY SPONSORED RESEARCH OR DEVELOPMENT

--

BACKGROUND OF THE INVENTION

The present invention relates generally to portable shelters for sports and the like and in particular to a portable shelter carried by a vehicle for and configured to be rapidly set up.

Popular shelters for the outdoor sportsman come in many configurations. Common design goals include protection from weather, ease of set up, transportability, reasonable price, and durability. Each design generally targets a specific activity such as fishing, hunting, backpacking, or camping. The rising popularity of outdoor recreation has generated many designs which address various aspects of outdoor recreation, with varying success in meeting the design goals mentioned above. For example, a lightweight design may not be durable and a design that is easy to transport may be difficult or time consuming to set up. Recently, "wheel houses" have become very popular for ice fishing. They provide a full range of amenities for "camping on the ice" including microwave ovens and televisions. On the other side of the spectrum, small canvas ice fishing shelters have become popular. They range in size from 'back-pack' models to six man 'fishing tents.' Several designs are camping 'tents' which are set up in a pickup truck cargo box. Recently, 'skid houses' have become increasingly popular. These are simply small fish houses that have skis mounted on the bottom so they can be towed on the ice with a snowmobile, or other type of vehicle.

SUMMARY OF THE INVENTION

The present invention provides a portable shelter that can be easily carried on a recreational vehicle bed for rapid deployment and relocation and adaptable for use with rigid panels offering simple lightweight construction.

More specifically, the invention provides a portable shelter for support on a vehicle bed and having a stationary unit attached to the periphery of the vehicle bed with sidewalls extending upward therefrom to a roof extending between the upper edges of the sidewalls to provide a first housing volume open at a rear face. A pivoting unit attaches to the stationary unit to move between an extended and retracted position with respect to the stationary unit by pivoting about a horizontal axis adjacent to the rear face, the pivoting unit in the retracted position having sidewalls extending upwardly adjacent the corresponding sidewalls of the stationary unit to a wall panel overlying the roof of the stationary unit, the pivoting unit in the extended position pivoting the sidewalls to extend rearwardly from the side-walls of the stationary unit with the wall panel displaced rearwardly from the rear face of the stationary unit to provide rearmost sidewall enclosing a second housing volume communicating with the first housing volume.

It is thus a feature of at least one embodiment of the invention to provide a shelter that can be compacted for travel and yet quickly deployed simply by pivoting.

The pivoting unit may further provide a retractable roof moving between a roof retracted position when the pivoting unit is in the retracted position to allow nesting of the stationary unit within the pivoting unit and extending over the side walls and third sidewall of the pivoting unit when the pivoting unit is in the extended position.

It is thus a feature of at least one embodiment of the invention to provide a roof enclosing the structure when it is deployed and yet can move from interference allowing the retracted position to provide a nesting of the stationary and pivoting unit.

The retractable roof may be a hinged panel having a first panel component hinged at a first edge to front edge of the wall panel about a horizontal axis and a second panel component hinged to at a first edge to a second edge of the first panel opposite the first edge; wherein the first and second panels hinge together to extend forwardly from the wall unit when the pivoting unit is in the retracted position and the first and second panels hinge apart to cover the sidewalls and third sidewalls of the pivoting unit when the pivoting unit is in the extended position.

It is thus a feature of at least one embodiment of the invention to provide a roof that can be constructed of rigid panels.

When the pivoting unit is in the extended position, the retractable roof of the pivoting unit and the roof of the stationary unit may provide a continuous roof overlying the stationary unit and the pivoting unit It is thus a feature of at least one embodiment of the invention to provide a portable shelter that provides a significant volume by employing area over the vehicle bed and rearward from the vehicle bed.

The portable shelter may include extendable legs extending downwardly from a lower edge of at least one of the side walls and wall panel of the pivoting unit in the extended position to support the pivoting unit against the surface on which a vehicle of the vehicle bed rests.

It is thus a feature of at least one embodiment of the invention to provide for shelter that can accommodate irregular terrain and different sizes of vehicles.

The side walls and roof of the stationary unit and the side walls and wall panel of the pivoting unit may be rigid panels providing inner and outer sheaths fixed about an insulation volume.

It is thus a feature of at least one embodiment to provide improved thermal resistance over tentlike materials while limiting the need for tent associated support poles and the like and the low durability of fabric.

The portable shelter may further include a spring extending between the pivoting unit and the stationary unit biasing the pivoting unit to the retracted position against the force of gravity.

It is thus a feature of at least one embodiment of the invention to provide a shelter that can be readily moved between the extended and retracted position without excessive force by a single individual.

The wall panel may include a door opening and closing to provide access to the second housing volume.

It is thus a feature of at least one embodiment of the invention to provide a convenient door opening in a panel least susceptible to weakening.

These particular objects and advantages may apply to only some embodiments falling within the claims and thus do not define the scope of the invention.

DETAILED DESCRIPTION OF THE PREFERRED EMBODIMENT

Figure 1:
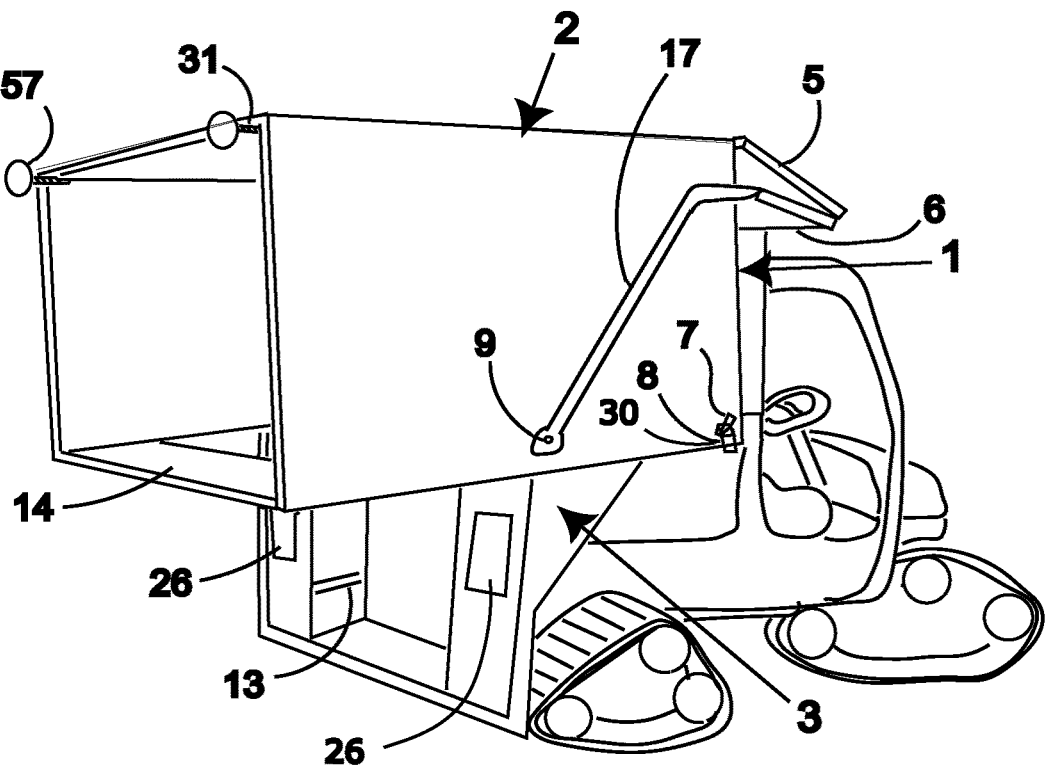
FIG. 1 is a perspective view of the shelter in the transport mode with tilt unit 2 nested when it is mounted on a utility terrain vehicle.

FIG. 1 illustrates the shelter of this invention mounted on a utility terrain vehicle (UTV). Base unit 3 mounts to the bed of the UTV by means of the vehicle's stake pockets or tie-down brackets. In FIG. 1 the shelter is in its transport mode, with tilt unit 2 in a horizontal position, nested over fixed unit 1. The roof of tilt unit 2 is folded in its bi-fold position so that rearward panel 5 is positioned over forward panel 6 to form a fairing configuration over the cab of the UTV. Tilt stop plate 7 captures the corner of tilt unit 2 and is held there by retention bolt 8, which is further illustrated in FIG. 3. The tilt unit pivots on pivot pin 9 which engages in pivot block 23, which are both illustrated further in FIG. 5 and FIG. 6. The forward side of tilt unit 2 is open to permit nesting over fixed unit 1. Stabilizer panel 14 connects the sidewalls of tilt unit 2 to add stability. Tail light windows 26 are positioned behind the UTV tail lights to retain street legal status of the UTV. Seat slots 13 accept and retain seat/tailgate unit 37, which is further described subsequently. Support legs 31 are also illustrated.

Figure 2:
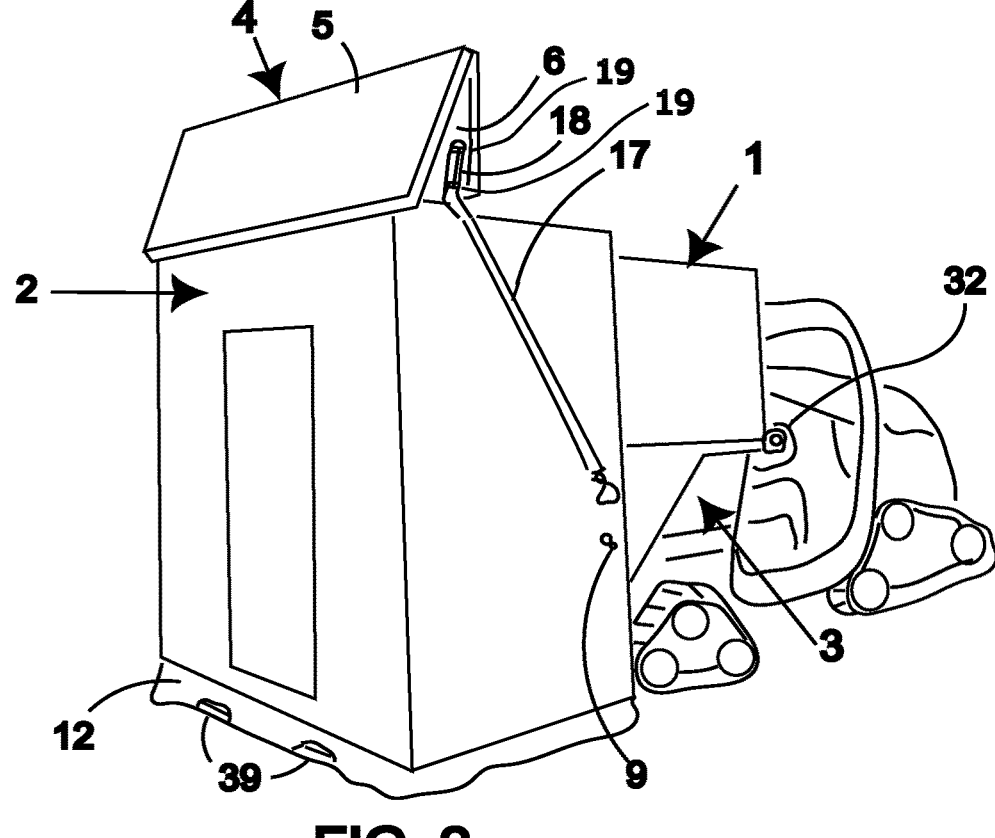
FIG. 2 is a perspective view of the shelter with the tilt unit in the extended position before bifold roof 4 is lowered into its 'flat' position.

FIG. 2 illustrates the shelter in its extended position after being tilted approximately 90 degrees to a vertical position, which is its utilization mode. The bi-fold roof 4, is shown before being lowered into a flat horizontal plane to provide weather protection for the shelter. The lowering of the roof is facilitated by manual manipulation utilizing actuator handle 17, which is further illustrated in FIG. 4. Actuator handle 17 can rotate 180 degrees within handle swivel tube 18 to provide the operator maximum leverage advantage when manipulating the bi-fold roof 4. Actuator handle 17 is retained in position within handle swivel tube 18 by handle collars 19. (FIG. 4 also illustrates roof engagement box 20 and roof engagement pin 21, which holds the roof in position when tilt unit 2 transitions from vertical utilization position to horizontal nested position and back to vertical position.)

Figures 3, 4:
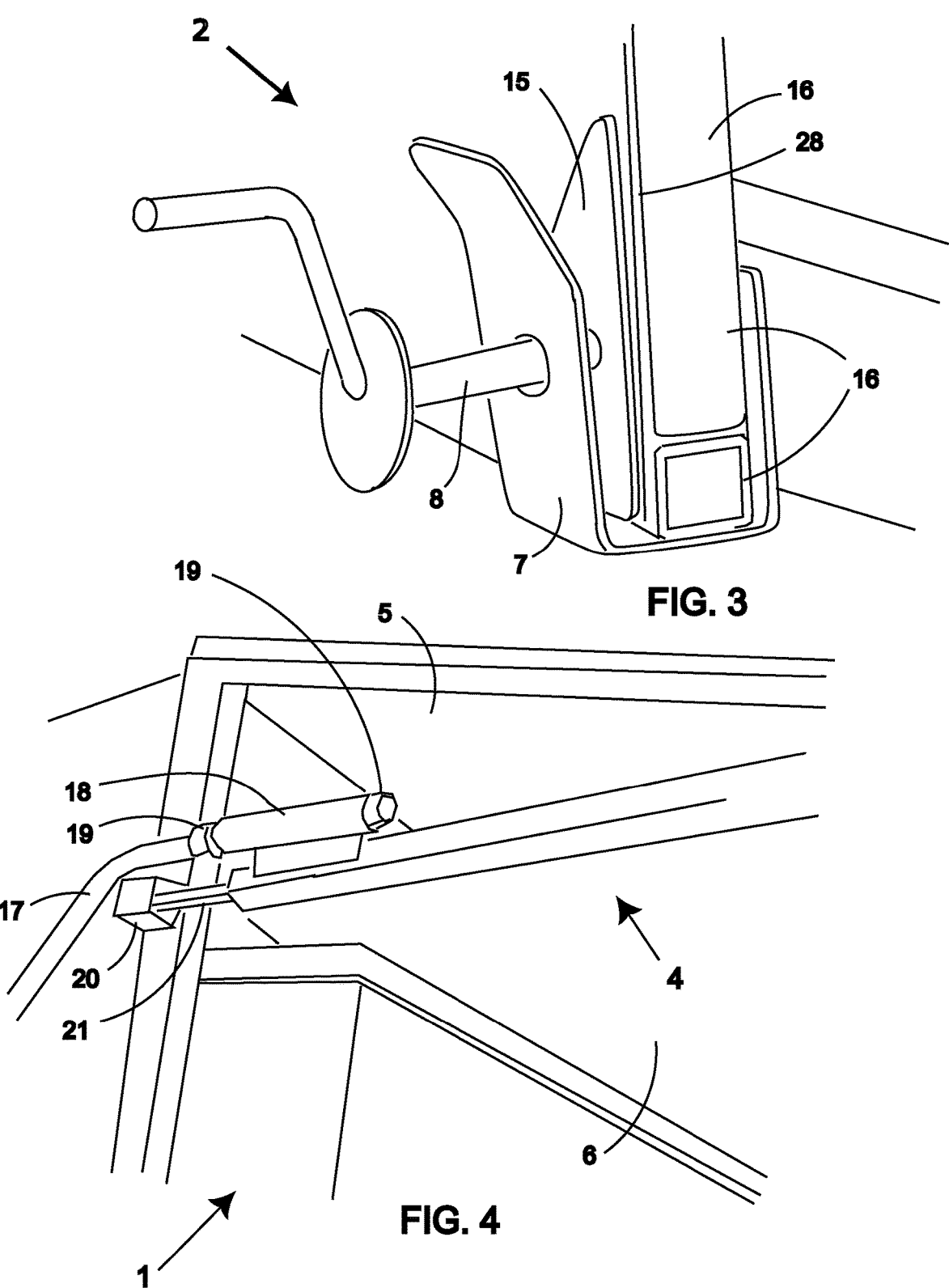
FIG. 3 is a close-up perspective view showing the tilt unit in the nested position with retention bolt 8 engaged to lock the tilt unit into the nested position.
FIG. 4 is a close-up, perspective view, showing a proportion of actuator handle 17 with rearward panel 5 and forward panel 6 of bi-fold roof 4 in the nested, bifold position over the fixed unit 1 roof.

FIG. 3 is a perspective view from the starboard side of the shelter showing a portion of tilt unit 2 stowed in its nested position. Retention bolt 8 has been inserted through tilt stop plate 7, sheathing 28, and reinforcement plate 15. Retention bolt 8 threads into a fixed nut which is located behind frame members 16.

FIG. 4 is a perspective view on the forward, starboard side of the shelter showing bi-fold roof 4 in the folded position as it projects forward of the fixed unit, forming a fairing over the UTV cab. Engagement pin 21 is shown captured in engagement box 20. The weight of bi-fold roof 4 forces engagement pin 21 into engagement box 20 and holds it there.

Figure 5:
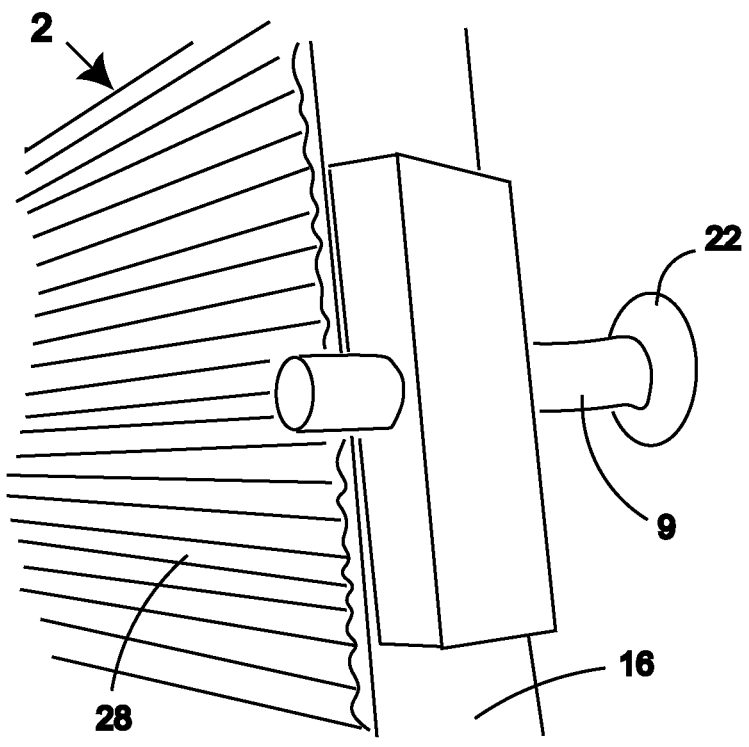
FIG. 5 shows the pivot pin 9 in perspective view.

FIG. 5 illustrates the pivot pin's attachment to the forward edge of tilt unit 2. Retainer disk 22 contacts the back side of pivot block 23 to prevent lateral withdrawal of the pivot pin from pivot pin notch 24. Pivot pins are located on each side of the tilt unit in lateral opposition.

Figure 6:
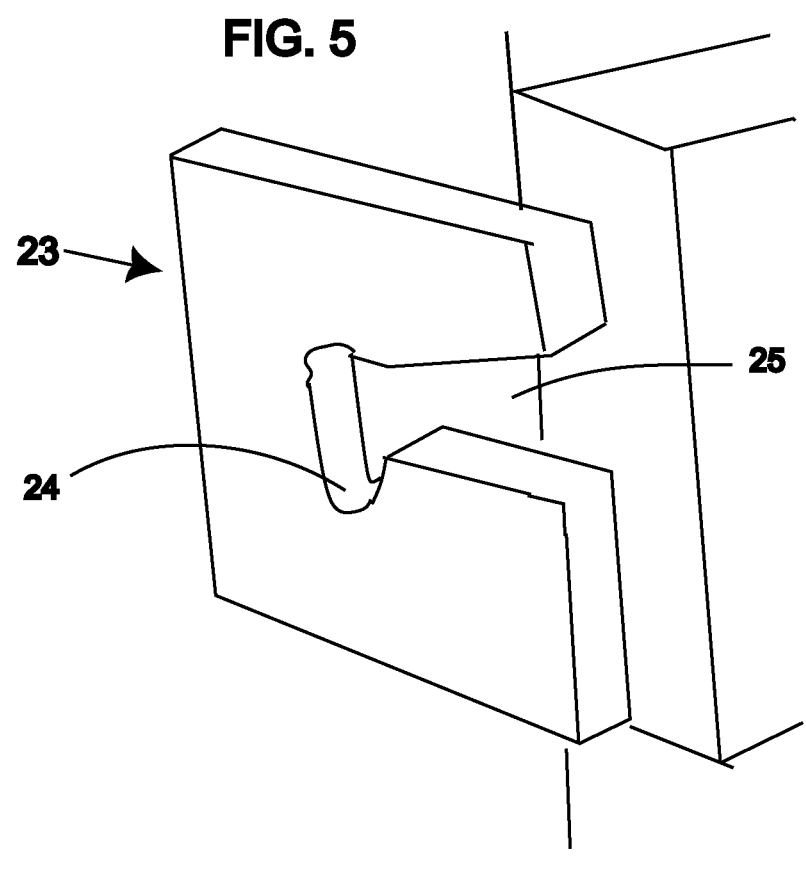
FIG. 6 shows the pivot block 23 in perspective view.

FIG. 6 illustrates pivot block 23. The pivot block is attached to each side of the fixed unit in the location of the pivot pin 9 as shown in FIGS. 1 and 2 to provide bi-lateral support for the tilt unit. The pivot block is set off from the base unit by spacers which provide approximately ½ inch of clearance for pivot pin 9 and retainer disk 22 access. Pivot pin 9 slides into pivot pin notch 24 by entering through pivot pin slot 25. The weight of tilt unit 2 holds pivot pin 9 in pivot pin notch 24 when tilt unit 2 is in the vertical utilization position. When tilt unit 2 is in the nested position, retention bolt 8 not only holds the tilt unit in the horizontal position, but it also prevents the tilt unit from shifting backwards, which could disengage pivot pin 9 from pivot pin notch 24.

Figures 7, 8, 9:
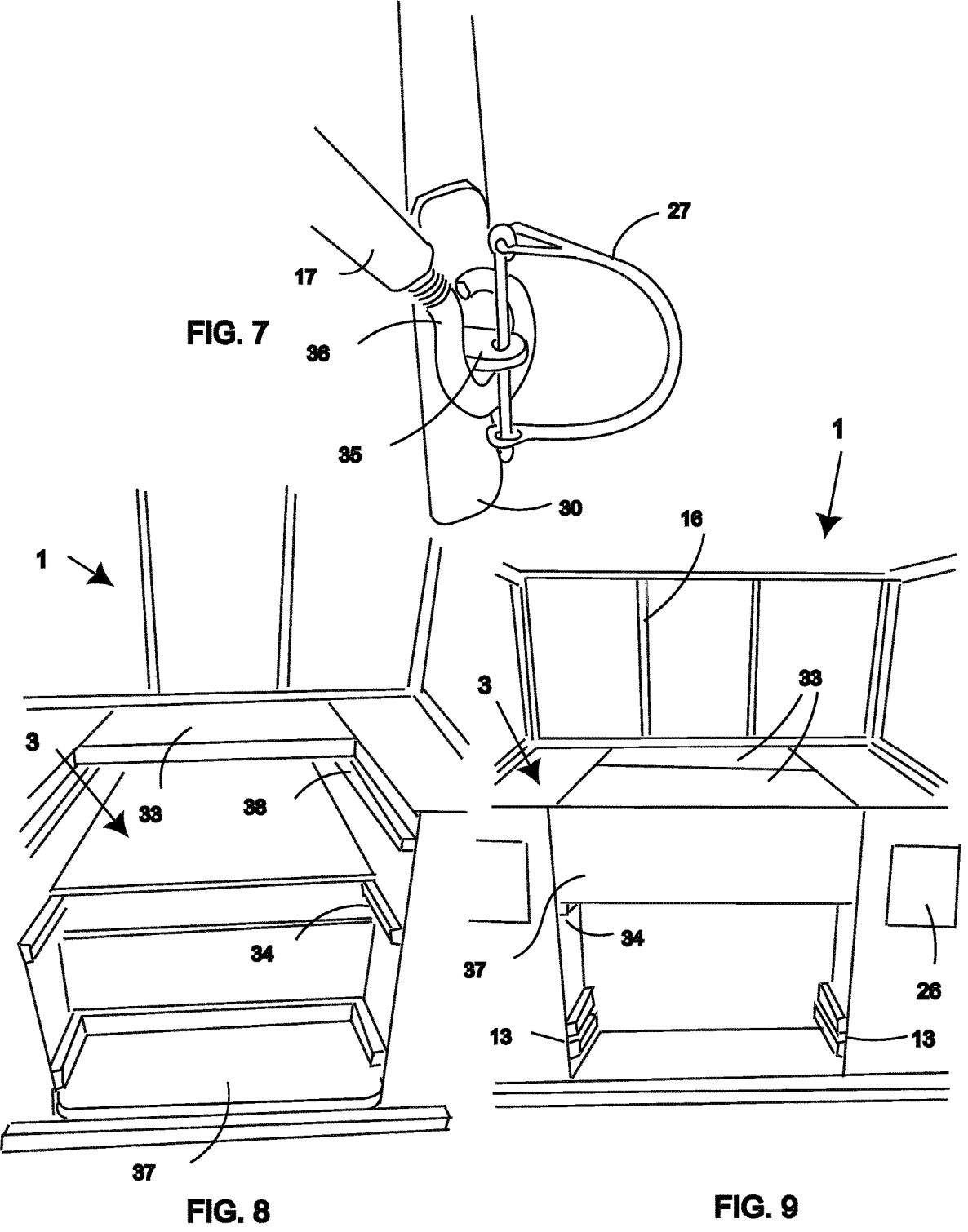
FIG. 7 shows the actuator handle retainer 30 in perspective as it engages with actuator handle 17.
FIG. 8 is a perspective view of the interior of the base unit and the fixed unit with one bed/floor platform 33 in place and seat/tailgate 37 in the seat position.
FIG. 9 is a perspective view of the interior of the base unit and the fixed unit with the seat/tailgate in the tailgate position.

FIG. 7 is a perspective view of actuator handle retainer 30 which is located in the position shown on FIG. 1. When the tilt unit is in the utilization position (vertical), actuator handle 17 is retained in the parked position by engagement of eye bolt 36 on tab 35 and captured by hitch pin 27. When the tilt unit is in the vertical (utilization) position, eye bolt 36 is captured on retention bolt 8, which locks the bi-fold roof in the flat, horizontal position.

FIG. 8 is a perspective view of the interior of base unit 3 and fixed unit 1. One section of bed/floor platform 33 is shown as it rests on bed supports 38. The second section of bed/floor platform 33 is not shown for clarity of illustration. The bed 4 platform can also be used as a floor when placed on the ice or ground. Seat/tailgate 37 is shown in its seat position when inserted into seat slots 13.

FIG. 9 is another perspective view of the interior of base unit 3 and fixed unit 1 showing the seat/tailgate in its tailgate position as it rests on tailgate support 34. Both bed platforms 33 are shown in position on bed supports 38.

Figure 10:
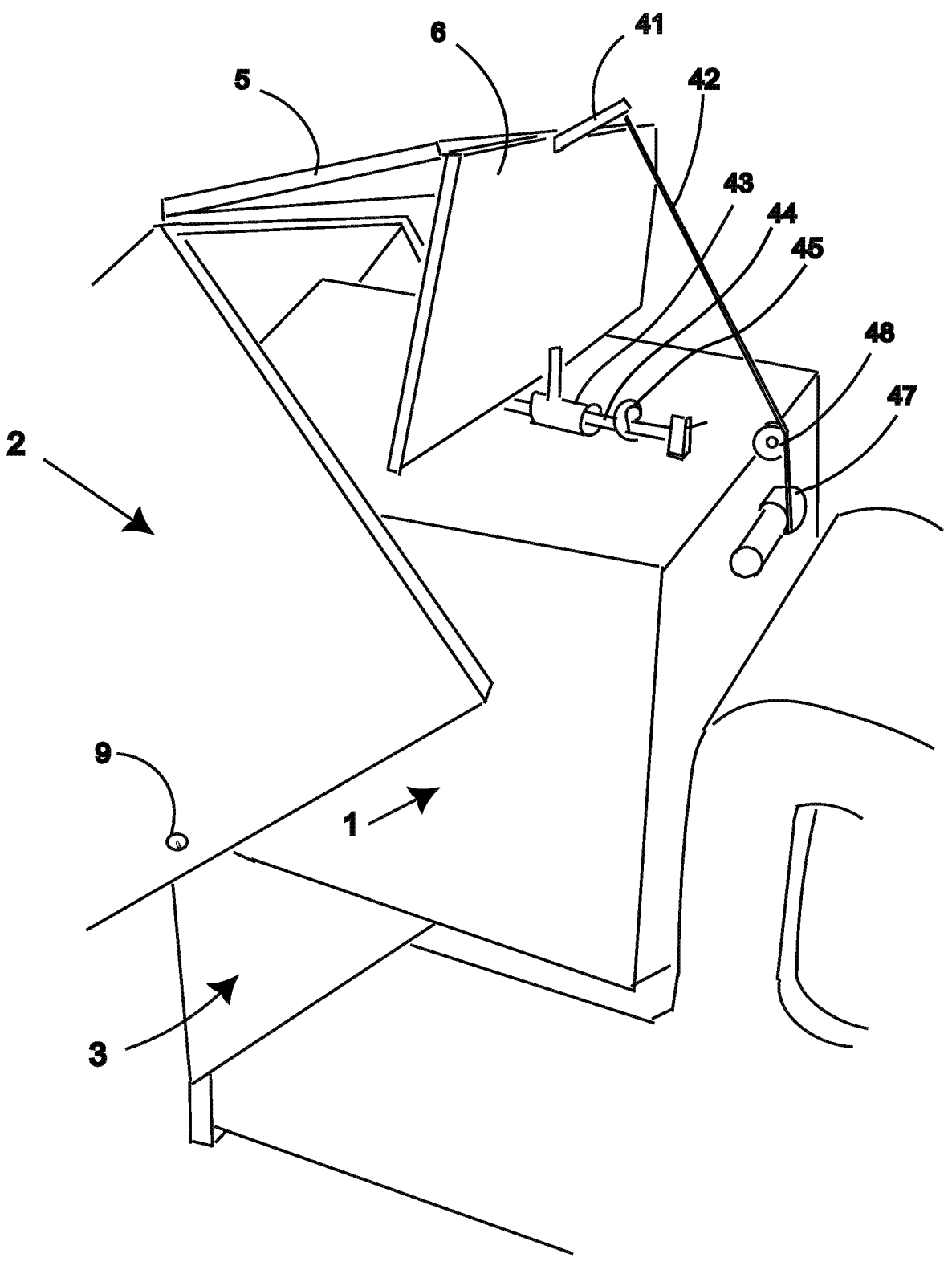
FIG. 10 is a perspective view illustrating the alternative actuation mechanism for folding the bi-fold roof into the nested position.

FIG. 10 illustrates the position of guide rod 44 on the fixed unit 1 roof, which is an optional mechanism for transitioning the roof to its bi-fold position. Guide tube 43 translates fore and aft on the guide rod, its forward motion limited by guide stop 45. The guide tube is connected by a pivot connection to the forward edge of roof panel 6. Roof cable 42 connects cable post 41 to winch 47. Pulley 48 guides the cable to the winch.

Figure 11:
FIG. 11 shows the operator raising tilt unit 2 by utilizing lifting bar 40 which is incorporated into skirt 12.

FIG. 11 illustrates the skirt 12 with lifting bar 40 which is contained in bar sleeve 49. Access openings 39 provide finger access to lifting bar 40 which allows the operator to use the bar as a lift handle to raise the tilt unit into its nested position.

Figure 12:
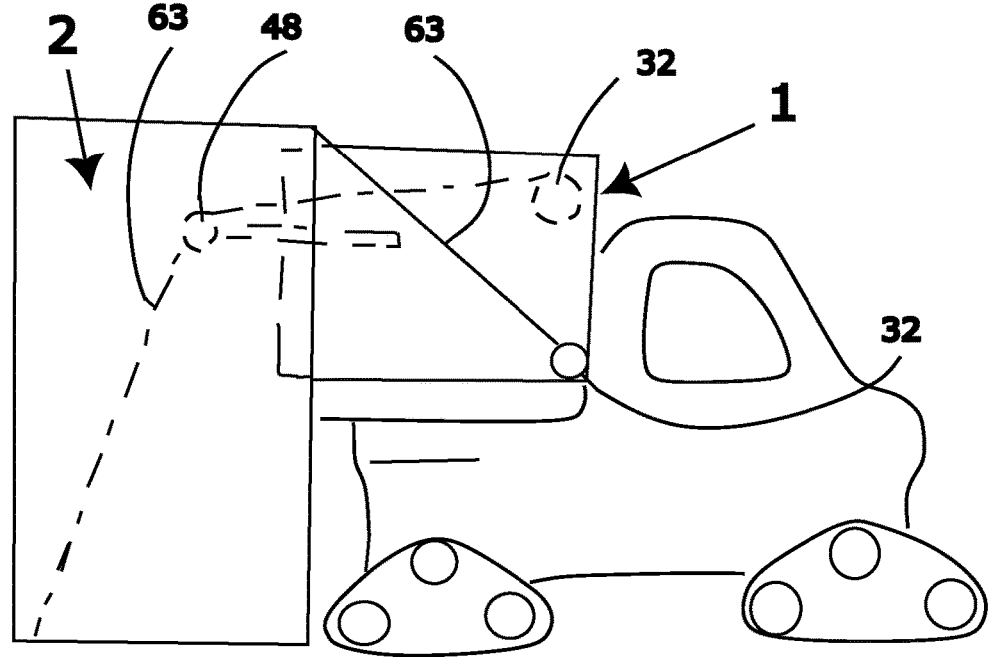
FIG. 12 and FIG. 13 illustrates alternative routing for the spring powered cable reel 32 and the cable.
Figure 13:
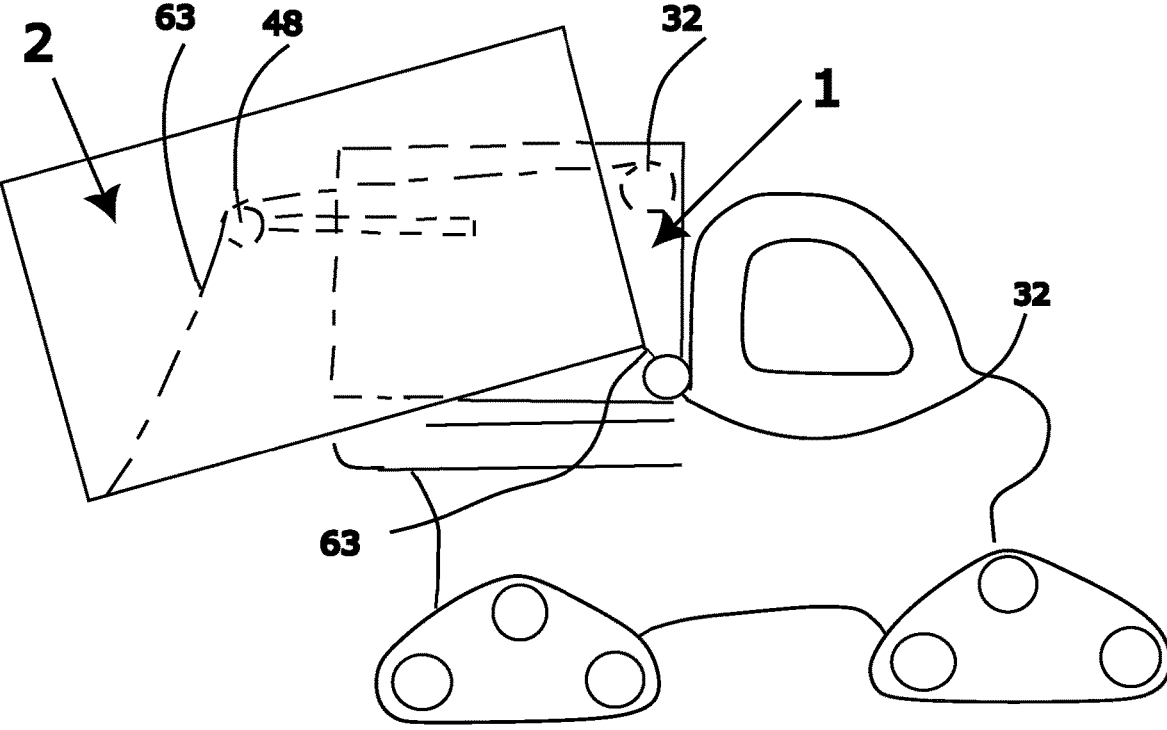

FIGS. 12 and 13 illustrates two alternative routing methods for the torsion spring lift assist mechanism. The spring powered cable reels 32 assist in lifting tilt unit 2 into its nested position. As shown in the dotted lines, tilt cable 63 can be routed through pulley 48 to an attachment point on the interior rearward bottom portion of tilt unit 2. Alternatively, tilt cable 63 can be attached to the top, forward corner of the tilt unit and attached directly to cable reel 32, as shown by the solid line for tilt cable 63.

Figure 14:
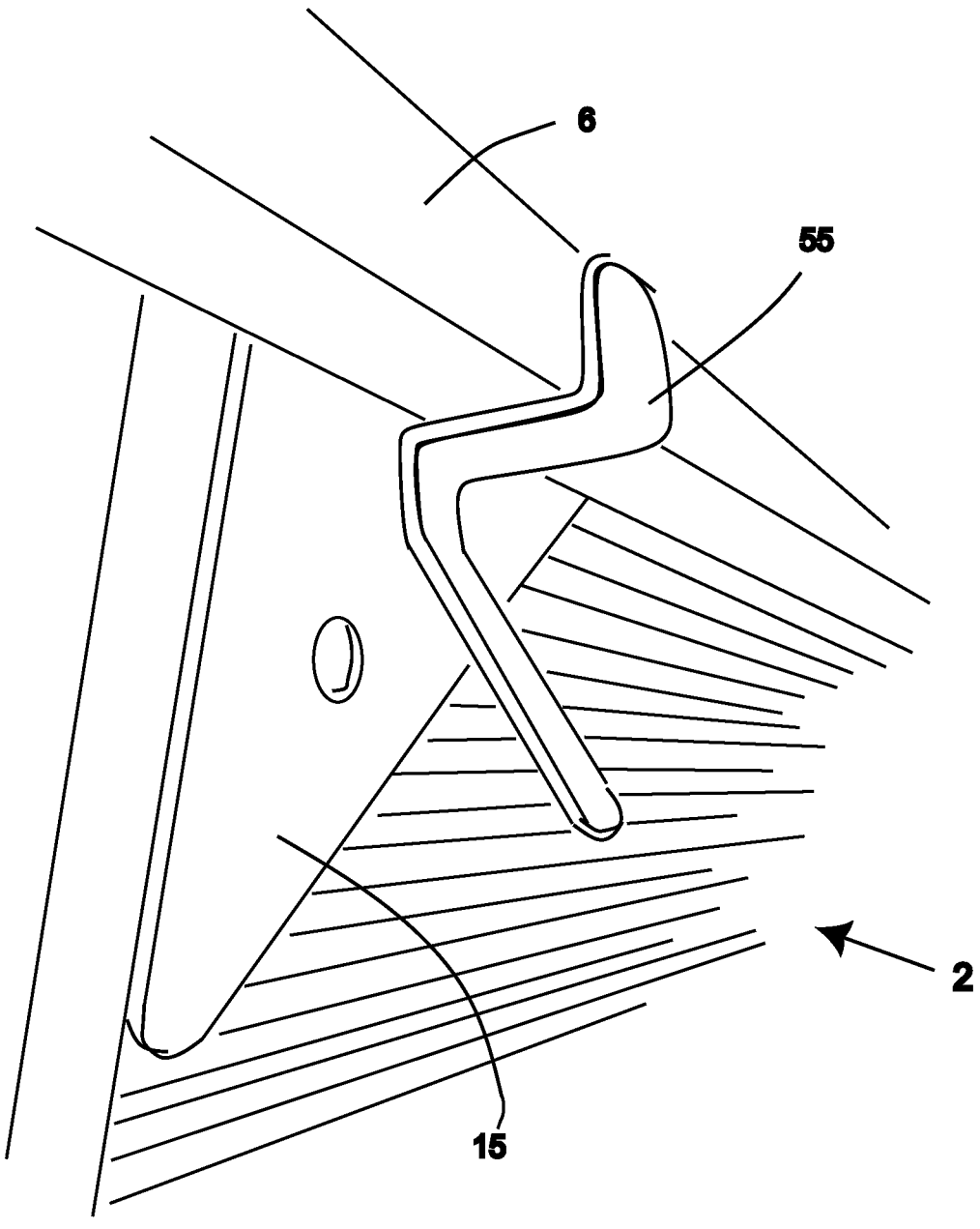
FIG. 14 is a perspective view illustrating wall stabilizing bracket 55 as it engages with a tilt unit wall panel.

FIG. 14 is a perspective view showing one of two wall stabilizer brackets 55, as it engages with a wall reinforcement plate 15 on the upper forward portion of a sidewall panel on tilt unit 2. Stabilizer bracket 55 assures the correct alignment of the side wall panels of tilt unit 2.

Figure 15:
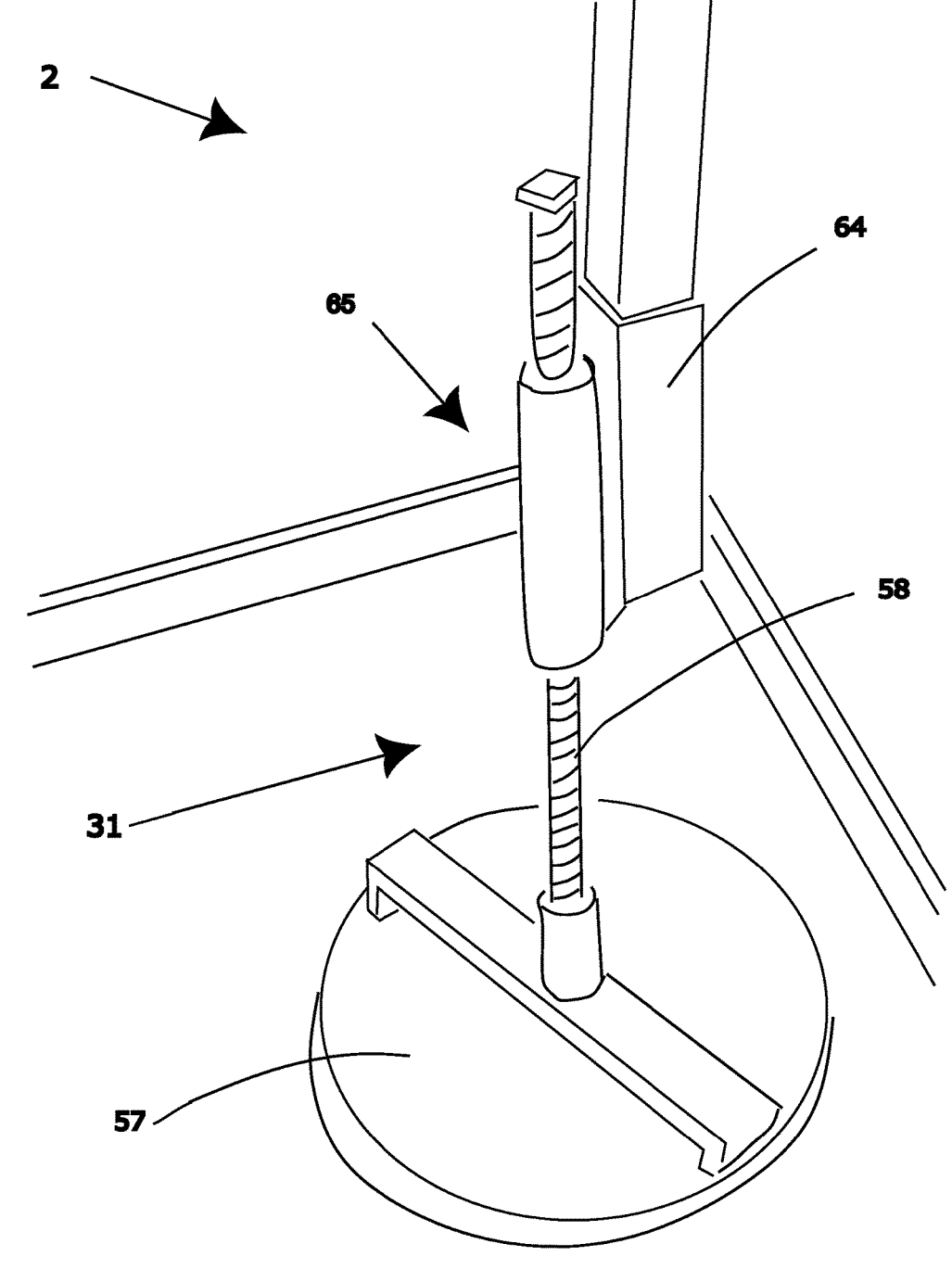
FIG. 15 Illustrates the screw jack partially extended to support tilt unit 2 in its correct alignment relative to fixed unit 1 and the underlying surface.

FIG. 15 is a perspective view showing height adjustment assembly 65. Skid plate 57 is adjusted in height adjustment screw 58 acting on threads in screw bracket 64.

Figure 16:
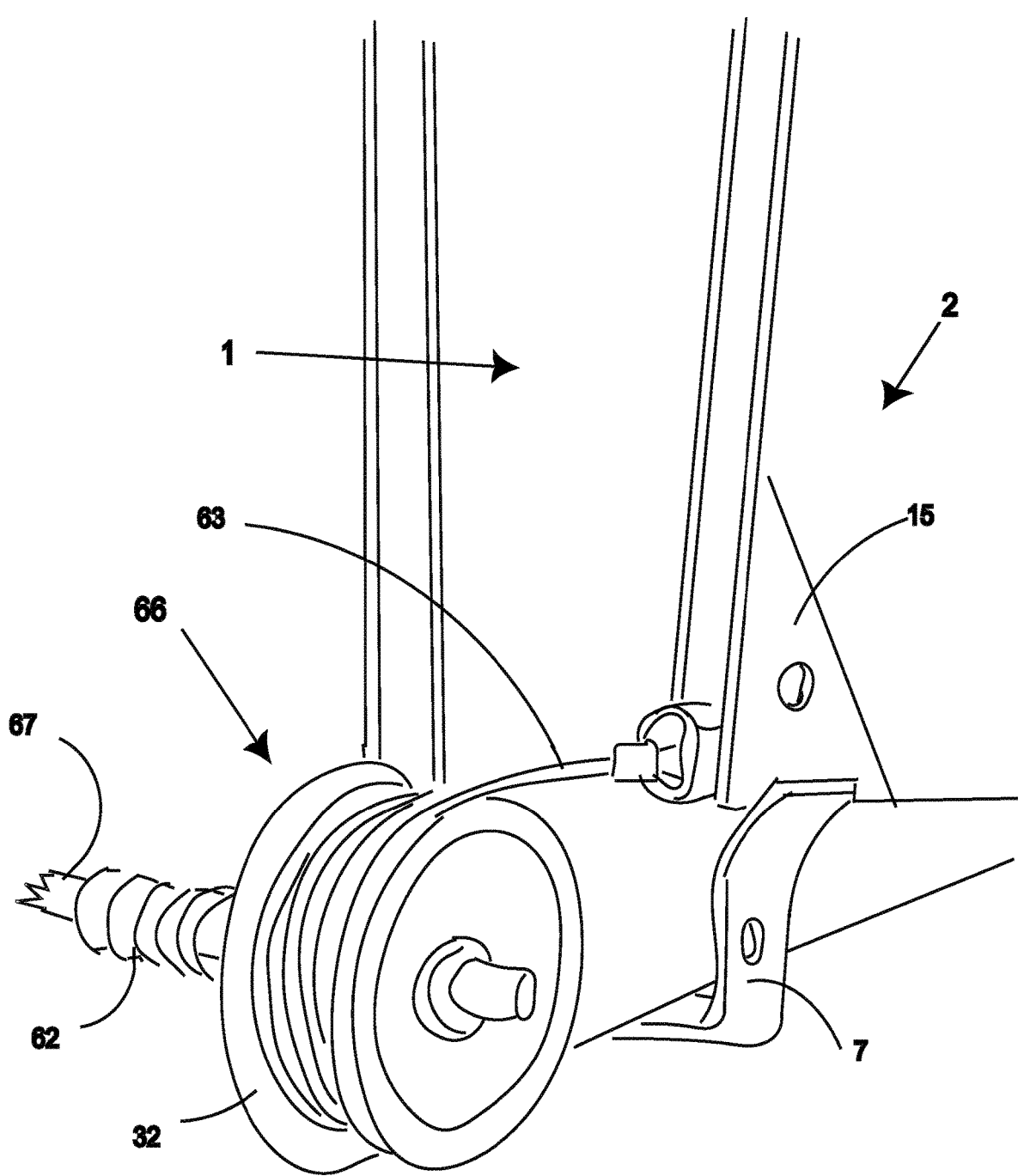
FIG. 16 illustrates a torsion spring retraction mechanism for lift assist of the tilt unit.

FIG. 16 shows cable reel 32 with tilt cable 63 in the retracted position. The lift assembly 66 incorporates spring bar 67, torsion spring 62, and cable reel 32.

Figures 17, 18, 19:
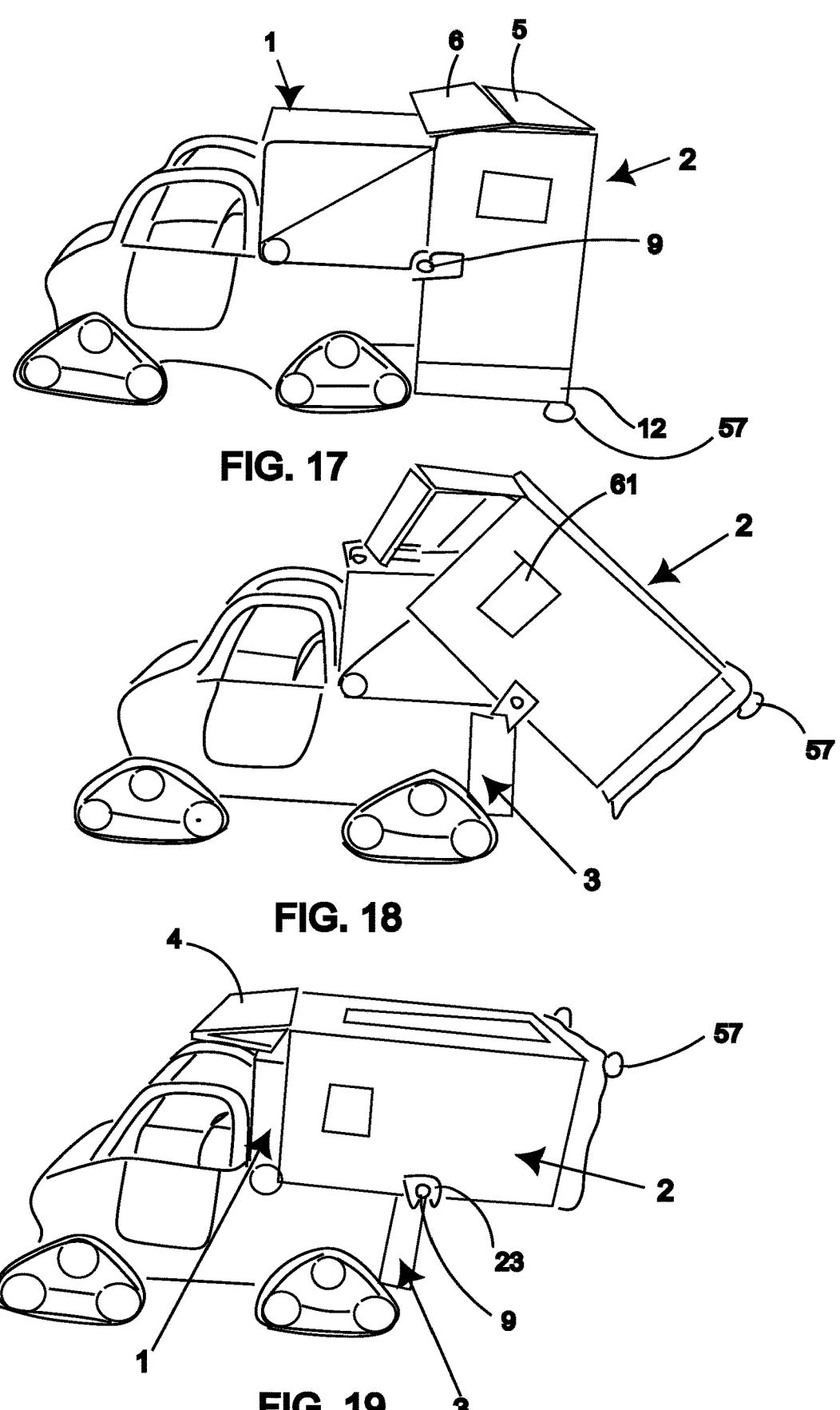
FIGS. 17, 18, and 19 illustrate the progressive tilt action from the extended position of FIG. 17 to the 'nested' position of FIG. 19.

FIGS. 17, 18, and 19 illustrates the transitioning of tilt unit 2 from the extended, utilization position to the horizontal, nested, position.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A portable shelter for support on a vehicle bed comprising:
a stationary unit attached to a periphery of the vehicle bed and having sidewalls extending upward therefrom to a roof extending between upper edges of the sidewalls to provide a first housing volume open at a rear face;
a pivoting unit attached to the stationary unit to move between an extended and retracted position with respect to the stationary unit by pivoting about a horizontal axis adjacent to the rear face, the pivoting unit in the retracted position having sidewalls extending upwardly adjacent to corresponding sidewalls of the stationary unit to a wall panel overlying the roof of the stationary unit, the pivoting unit in the extended position pivoting the sidewalls to extend rearwardly from the sidewalls of the stationary unit with the wall panel displaced rearwardly from the rear face of the stationary unit to provide a rearmost sidewall enclosing a second housing volume communicating with the first housing volume.

2. The portable shelter of claim 1 wherein the pivoting unit further provides a retractable roof moving between a roof retracted position when the pivoting unit is in the retracted position to allow nesting of the stationary unit within the pivoting unit and extending over the sidewalls and third sidewall of the pivoting unit when the pivoting unit is in the extended position.

3. The portable shelter of claim 2 wherein the retractable roof is a hinged panel having a first panel component hinged at a first edge to a front edge of the wall panel about a horizontal axis and a second panel component hinged at a first edge to a second edge of the first panel opposite the first edge; wherein the first and second panels hinge together to extend forwardly from the wall unit when the pivoting unit is in the retracted position and the first and second panels hinge apart to cover the sidewalls and third sidewalls of the pivoting unit when the pivoting unit is in the extended position.

4. The portable shelter of claim 2 wherein when the pivoting unit is in the extended position, the retractable roof of the pivoting unit and the roof of the stationary unit provide a continuous roof overlying the stationary unit and the pivoting unit.

5. The portable shelter of claim 1 further including adjustable legs extending adjustably downwardly from a lower edge of at least one of the sidewalls and wall panel of the pivoting unit in the extended position to support the pivoting unit against a surface on which a vehicle of the vehicle bed rests.

6. The portable shelter of claim 1 wherein the sidewalls and roof of the stationary unit and the sidewalls and wall panel of the pivoting unit are rigid panels providing inner and outer sheaths fixed in separation about an insulation volume.

7. The portable shelter of claim 1 further including a spring extending between the pivoting unit and the stationary unit biasing the pivoting unit to the retracted position against a force of gravity.

8. The portable shelter of claim 1 wherein the wall panel includes a door opening and closing to provide access to the second housing volume.

5

* * * * *